United States Patent Office 3,032,549
Patented May 1, 1962

3,032,549
LIGHT AND HEAT STABLE CELLULOSE AND PROCESS
Reid Logan Mitchell, Morristown, N.J., assignor to Rayonier Incorporated, Shelton, Wash., a corporation of Delaware
No Drawing. Filed Oct. 26, 1959, Ser. No. 848,507
3 Claims. (Cl. 260—212)

This invention relates to cellulose whiteness stability, and has for its object the provision of an improved process for the treatment of purified cellulose to maintain its whiteness and supress its discoloration by light and heat, and also an improved light and heat stable cellulose. It is to be understood that discoloration means the development of coloration, and that the light and heat exposures include aging which results from relatively long periods under normal conditions or shorter periods under accelerated conditions.

The spontaneous coloring on exposure to light and heat of bright white cellulose, such as high alpha pulp of the type used for photographic papers, or clear film such as viscose cellophane, has remained an unsolved problem. As a result of many investigations, it has been determined that unduly accelerated change to an objectionable color can result from insufficient purification, improper bleaching, residual acidity, residual trace metals, heat aging exposure to high humidity and ultraviolet light, but there has been no practical and effective solution proposed heretofore to maintain the brightness of the cellulose at really adequate levels when exposed to heat and light.

This invention is based on my conception that the whiteness stability of the cellulose may be maintained or controlled by combining with the cellulose small amounts of substituent groups so located as to stabilize the cellulose against undesirable degradation, and as a result of my investigations, I have confirmed that the discoloration can be effectively reduced by combining with the cellulose very small amounts of ethylene oxide. Without intending to base this invention on any specific theory, a plausible explanation based on present knowledge is that cellulose, being a polymer of high molecular weight, may contain certain highly accessible and degradation-sensitive groups such for example as functional aldehydes and carbonyls existing at chain ends and at damage sites which when exposed to chemicals, heat, light or aging may undergo or stimulate progressive changes resulting in discoloration. By combining small amounts of ethylene oxide with these sensitive groups of the cellulose by directed hydroxyethylation to cover and protect them through deactivation, in what I regard as "trace-substitution," the cellulose has improved color stability when exposed to heat and moisture or light. The trace-substituents may be regarded as being "built-in" the cellulose molecular structure and may replace or block or mask degradation sensitive sites which without protection, on exposure to heat and light, would further deteriorate producing scission fragments that alone or after repolymerization and condensation are yellow or brown.

Regardless of the theory postulated, the results of adding these protective groups to selected sites even in very small amounts is to accomplish a marked maintenance or stabilization of brightness. The benefits may be realized in the treated fibrous chemical cellulose, in products made therefrom and further in regenerated fibers or films treated subsequent to spinning or casting.

In carrying out a process of the invention for the directed and selective combination of trace amounts of ethylene oxide with cellulose, the cellulose is first contacted as by immersion with a controlled dilute aqueous solution of sodium hydroxide to activate it in the desired sites and then reacted with gaseous ethylene oxide to substitute ethylene oxide on the exposed aldehyde and/or carbonyl groups of the cellulose.

It is well known that cellulose has a large number of hydroxyl groups and that strong or concentrated solutions of sodium hydroxide will penetrate the fiber structure, disrupt hydrogen bonds and react with the hydroxyl groups making them highly reactive to ethylene oxide. The conversion of cellulose to soluble hydroxyethyl cellulose is based upon the substitution of ethylene oxide on these hydroxyl groups. In my process I specifically aim to avoid this customary reaction of sodium hydroxide with the hydroxyl groups of the cellulose as the resulting substitution of ethylene oxide, even in small amounts, only wastes ethylene oxide and sodium hydroxide and does not provide the desired brightness stability. Moreover, the substitution of ethylene oxide on hydroxyls changes the cellulose to an alkali soluble or even a water soluble type of hydroxyethyl cellulose which is not what my process achieves. It is, accordingly, an object of the invention to use only enough sodium hydroxide to effect what could be regarded as a catalytic reaction of the ethylene oxide with the degradation sensitive exposed groups, thus avoiding as much as possible the reaction of sodium hydroxide with the hydroxyl groups. I achieve this result by contacting the cellulose with a dilute solution preferably containing about 1% but preferably not over 4% of sodium hydroxide.

The amount of ethylene oxide substituted and the site of substitution is therefore predetermined and controlled to a considerable extent by the concentration of sodium hydroxide used in pretreating the cellulose, and also to some extent by the amount and duration of the subsequent treatment with ethylene oxide. The treatment with ethylene oxide may be carried out after any stage of the treatment of cellulose with a dilute aqueous solution of sodium hydroxide, such as in the alkaline refining of high alpha cellulose pulp or in special impregnation or steeping operations. In the contacting of sheets of cellulose pulp, such as dissolving pulp or paper, a dilute sodium hydroxide solution may be forced through the pulp sheet as described in the patent of Reid Logan Mitchell and Paul Henry Schlosser No. 2,614,102, and then the ethylene oxide may then be forced through the sheet. The activated sheets may also be disintegrated and treated batchwise or continuously in a gaseous atmosphere of ethylene oxide.

In this process, the contacting of the cellulose with sodium hydroxide in aqueous solution is very carefully controlled with respect to the conditions and concentrations to obtain a given effective level of substitution in the final product. For example, the sodium hydroxide concentration can vary from less than 1% to about 3% or 4% or even borderline 6% at elevated temperatures, the temperature for addition from 5° to 50° C., and the time is not critical as the presence of the right amount of sodium hydroxide is the most important requirement. Efficiency of hydroxyethylation is benefited by use of high consistencies of say 26% and upwards, since the accessibility of the ethylene oxide gas to the cellulose structure is much better in the absence of excess surface liquor on the fiber.

It is important, or at least sufficient, to substitute on the cellulose the smallest amount of ethylene oxide that will prevent or inhibit discoloration to the desired extent based on end-use requirements. This may be accomplished by substituting on the cellulose from 0.1% to 3.0%, or even 5%, preferably 1%, of ethylene oxide based on the dry weight of the cellulose. The ethylene oxide is preferably reacted with the cellulose at a temperature within the range of from 20° to 90° C. under conditions leading to about 50% efficiency of conversion.

The surprisingly small amount of ethylene oxide required to give the beneficial results obtained seems to be due to the small amount of the degradation sensitive groups, to the high degree of accessibility and exposure of such damage-site areas and to the high degree of reactivity of such groups for ethylene oxide when activated with low levels of sodium hydroxide insufficient to activate other possible substitution sites, such as the hydroxyl groups.

The level or amount of substitution appears to control the tendency for maintained brightness, but the amount of substitution and the prevention of discoloration do not seem always to be proportional, a result perhaps of inherent differences in different types of pulp with respect to the number of degradation sensitive sites that need to be covered.

Although the brightness instability is more severe in chemical wood cellulose than in purified cotton linters cellulose, color development does occur with cotton and the suggested trace substitution treatment is beneficial to cotton as well as to wood cellulose.

The following tests illustrate the results of treating cellulose with various concentrations of sodium hydroxide and ethylene oxide:

Five pound batches of high-alpha cellulose pulp were slurry steeped in 1%, 3%, 6%, 9% and 18.5% caustic solution, pressed to 30% consistency and shredded in the Sprout-Waldron shredder. These batches were then reacted at 60° C. with ethylene oxide in a reactor. The vessel was evacuated to 20 inches of mercury prior to the charge addition. Ethylene oxide charges were chosen with the projected goal of producing for each activation caustic strength three substitution levels, 1, 3 and 5%. The reacted products were washed free of sodium hydroxide, treated with $SO_2$ water to a pH of 6.0 and dried to 85% O.D. At each activation level batches were substituted at the 1%, 3%, and 5% ethylene oxide level. The products were studied for brightness stability, variations in gel swelling, slurry properties, and caustic solubility. Results indicated that the pulp's capacity to remain color-stable to aging and heating was influenced by caustic activation strength as well as the degree of substitution. The results of these tests are shown in the following table.

($S_{10}$) shown in the table tends to increase with increasing amount of substitution. At a substitution level of 1%, activation caustic strength shows only a minor influence on these two properties. At 3% substitution the influence is pronounced, both properties increasing sharply for products with a 9% and 18.5% caustic activation.

The brightness stability is affected by both caustic activation strength and degree of ethylene oxide substitution as shown in the table by reflectance drop as a function of ethylene oxide substitution at different caustic treatments after heat exposure of 140° C. for 16 hours. The strong caustic activation fails to prevent a large reflectance drop, e.g., reflectance of pulp which was steeped in 18% NaOH dropped 27% after heat exposure, whereas pulp steeped in 1%–9% NaOH had a drop of 11–17%. Substitution with ethylene oxide enhances the brightness stability, 1% ethylene oxide substitution giving a practical maximum of stability. Substituting above this level does not further inhibit color to any substantial extent. Thus, very mild treatment conditions give the best stability, namely, 1%–3% NaOH activation and 1% ethylene oxide substitution. Furthermore, with mild activation, this can be obtained without damage to paper-making qualities.

The data in the last three columns of the table show that as the sodium hydroxide concentration is increased above 6% that sharply more of the hydroxyl groups are activated to form —ONa, which causes the increased secondary swelling, decreased drainage, and increased caustic solubility.

In effect, there are two different reaction areas obtainable with ethylene oxide, depending upon pre-activation and the reaction conditions employed. Choice may be made based on the intended product end-use. For improved color stability, the use of low caustic concentrations (1 to 3%) and a trace substitution level of 1% or less will safely produce a product with maximum improvement in color protection with minimum loss in other essential physical properties, and with little or no increase in solubility. The use of low caustic in the activation step appears to direct the ethylene oxide-substitution reaction preferentially to the labile color-sensitive groupings. Such substitution produces a cellulose fiber

*Brightness Stability Measurements On Trace Substituted Of High-Alpha Cellulose*

| Sample | Reflectivity, Percent [1] | | Reflectivity Difference, Heat-aged | Secondary Swelling, Percent | Drainage Rate, Secs. | $S_{10}$, Percent |
|---|---|---|---|---|---|---|
| | Original | Heat-aged | | | | |
| Control | 90.2 | 79.7 | 10.5 | 99 | 11.5 | 2.2 |
| 0% Ethylene Oxide: | | | | | | |
| 1% NaOH | 91.0 | 79.0 | 12.0 | 99 | 11.0 | 5.7 |
| 3% NaOH | 90.0 | 78.4 | 11.6 | 99 | 10.8 | 5.1 |
| 6% NaOH | 91.9 | 80.8 | 11.1 | 100 | 8.0 | 4.7 |
| 9% NaOH | 91.6 | 75.1 | 16.5 | 97 | 7.1 | 4.0 |
| 18% NaOH | 88.8 | 61.8 | 27.0 | 93 | 4.2 | 4.2 |
| 1% Ethylene Oxide: | | | | | | |
| 1% NaOH | 92.9 | 86.8 | 6.1 | 112 | 11.8 | 8.2 |
| 3% NaOH | 92.2 | 84.2 | 8.0 | 116 | 11.5 | 8.3 |
| 6% NaOH | 93.0 | 84.1 | 8.9 | 118 | 8.8 | 8.1 |
| 9% NaOH | 91.3 | 79.6 | 11.7 | 115 | 7.7 | 8.1 |
| 18% NaOH | 90.2 | 65.5 | 24.7 | 116 | 4.7 | 9.0 |
| 3% Ethylene Oxide: | | | | | | |
| 1% NaOH | 91.7 | 85.1 | 6.6 | 114 | 11.0 | 13.1 |
| 3% NaOH | 91.5 | 82.9 | 8.6 | 120 | 10.6 | 12.9 |
| 6% NaOH | 93.0 | 82.8 | 10.2 | 122 | 10.0 | 12.4 |
| 9% NaOH | 92.1 | 79.4 | 12.7 | 132 | 10.2 | 17.4 |
| 18% NaOH | 91.0 | 66.8 | 24.2 | 152 | 6.0 | 52.5 |
| 5% Ethylene Oxide: | | | | | | |
| 1% NaOH | 91.2 | 87.0 | 4.2 | 126 | 12.0 | 16.2 |
| 3% NaOH | 91.1 | 81.9 | 9.2 | 123 | 12.5 | 17.5 |
| 6% NaOH | 92.3 | 82.1 | 10.3 | 128 | 13.0 | 21.2 |
| 9% NaOH | 92.4 | 79.9 | 12.5 | 145 | 17.5 | 52.5 |
| 18% NaOH | 92.3 | 70.3 | 22.0 | 174 | 7.5 | 67.7 |

[1] $\lambda=457$, heat aged 16 hrs. 140° C.

The slurry performance properties show several trends with the amount of substitution and strength of caustic treatment. The drainage time for the most part increases with the amount of substitution, and decreases as the caustic concentration for activation is increased.

The secondary swelling and solubility in 10% caustic that is substantially insoluble in strong caustic, for example, solution of from 5% to 18% sodium hydroxide. The use of strong caustic (above 6%), on the other hand, activates the numerous hydroxyl groupings and reaction under these conditions leads substantially to hydroxyl-substitution. Chemical substitution of the hydroxyl group conveys the alkali-solubility characteristics desired in an hydroxyethyl cellulose product for dissolving purposes, but does provide far below the maximum whiteness stability. In the case of an hydroxyethyl cellulose product for film end-use, complete solubility is essential at even 5% NaOH level in the dissolving liquid, and the optimum reaction zone for this purpose requires the use of strong caustic and higher level of substitution, i.e., 20% NaOH and 4% or more of ethylene oxide substitution.

This application is a continuation-in-part of my co-pending patent application Serial No. 612,576, filed September 28, 1956, now abandoned.

I claim:

1. The process of producing a fibrous cellulose product which has improved whiteness stability when exposed to light and heat which comprises contacting the cellulose fibers with a dilute aqueous solution containing not over 4% of sodium hydroxide, the amount of sodium hydroxide being sufficient to induce activation of easily accessible damage site aldehydes and carbonyls while retaining the hydroxyl groups substantially unchanged, and reacting the said treated fibers with from 0.1 to 5% of ethylene oxide to combine with the aldehyde and carbonyl groups to form a light and heat stable fibrous cellulose product which is substantially insoluble in 18% sodium hydroxide solution.

2. The process of producing a light and heat stable fibrous cellulose product which comprises contacting the cellulose fibers in sheet form with an aqueous solution containing not over 4% of sodium hydroxide such as to avoid activation of an appreciable proportion of the hydroxyl groups of the cellulose, and reacting the fibers while in contact with the sodium hydroxide with ethylene oxide to selectively react with the aldehyde and carbonyl groups and effect less than 3% ethylene oxide substitution, whereby the fibrous and sheet character of the cellulose is retained and the cellulose is substantially insoluble in 5% sodium hydroxide solution.

3. A high whiteness fibrous cellulose product which has improved color stability when exposed to light and heat characterized by having up to 5% of ethylene oxide reacted essentially with damage site aldehydes and carbonyls with practically no hydroxyl substitution and which is substantially insoluble in 5% sodium hydroxide solution.

References Cited in the file of this patent
UNITED STATES PATENTS

| | | |
|---|---|---|
| 1,863,208 | Schorger | June 14, 1932 |
| 2,137,343 | Maxwell | Nov. 22, 1938 |
| 2,572,039 | Klug et al. | Oct. 23, 1951 |
| 2,610,180 | Klug | Sept. 9, 1952 |
| 2,847,411 | Mitchell et al. | Aug. 12, 1958 |